Sept. 22, 1970  A. G. LAUTZENHISER  3,529,476
SQUEEZE FILM GAS BEARING AND AN ACCELEROMETER USING SAME
Filed Nov. 28, 1966
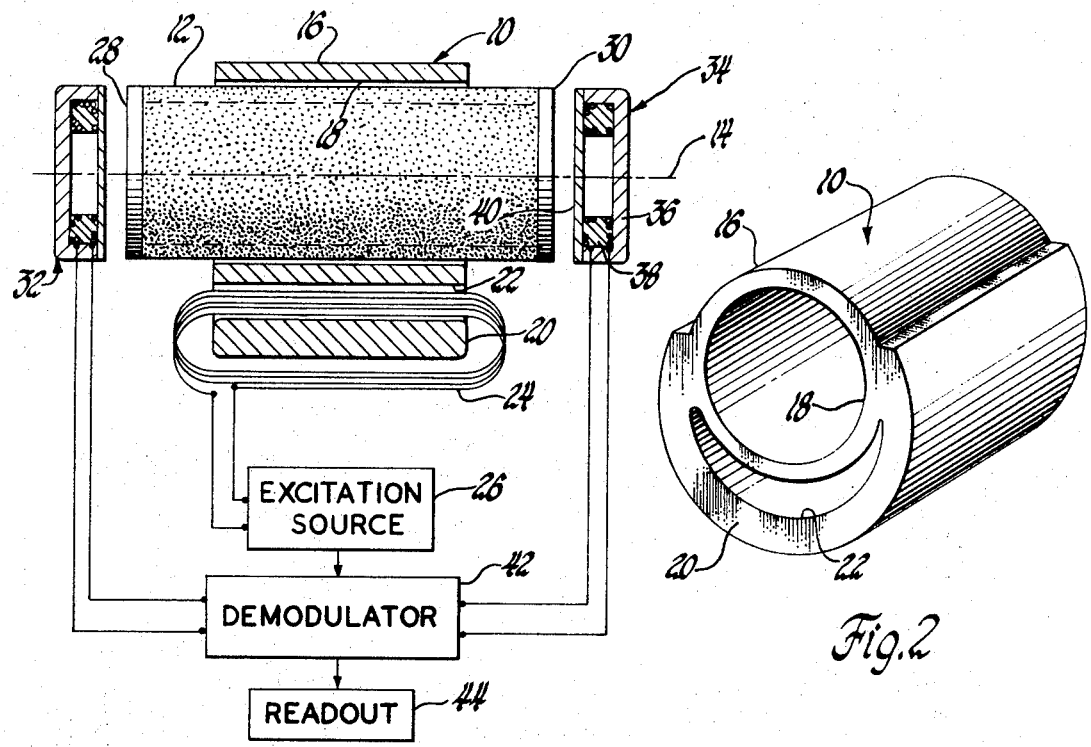
Fig.1
Fig.2
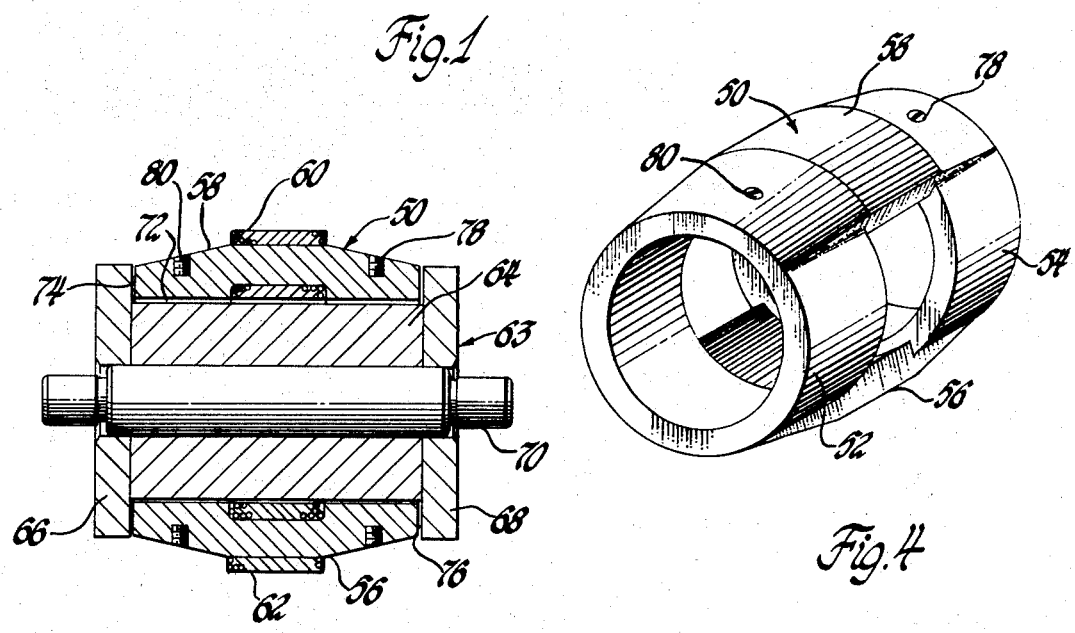
Fig.3
Fig.4
INVENTOR.
Argyle G. Lautzenhiser
BY
Thomas N. Young
ATTORNEY

United States Patent Office 3,529,476
Patented Sept. 22, 1970

3,529,476
SQUEEZE-FILM GAS BEARING AND AN ACCELEROMETER USING SAME
Argyle G. Lautzenhiser, Magnolia, Mass., assignor to General Motors Corporation, Detroit, Mich., a corporation of Delaware
Filed Nov. 28, 1966, Ser. No. 597,287
Int. Cl. G01p *15/08*
U.S. Cl. 73—516                8 Claims

ABSTRACT OF THE DISCLOSURE

A hydrostatic gas bearing is disclosed which includes a cylinder stator of magnetostrictive material for accommodating a cylindrical mass in spaced relationship therewith. An externally appendant portion integrally formed with the cylinder accommodates a winding which, when energized with time varying current, produces a flux pattern around the bore causing periodic radial constrictions of the cylinder. In another embodiment, the flux pattern produces both radial and axial constrictions of the stator.

---

This invention relates to bearings and, more particularly, to hydrostatic gas bearings in which mass support is accomplished by the pumping action of a magnetostrictive material.

This invention rests upon the principle that a magnetostrictive material, when subjected to a magnetic field, undergoes temporary dimensional changes. In accordance with the principle, it is an object of the invention to suspend a mass free from contact with its surroundings by means of a film of gas, such as air or helium, generated by the pumping action of a magnetostrictive stator. Moreover, the mass may be suspended in such a manner as to be substantially free of rotational torques.

This is accomplished through the combination of a magnetostrictive stator having an axial portion of substantially cylindrical design and having an axial bore which accommodates a cylindrical mass in spaced relation therewith. The stator includes an externally appendant portion which accommodates a winding which, when energized with time varying current, produces flux in the appendant portion. The appendant portion is magnetically integrated with the cylindrical portion to produce a flux pattern in the stator around the bore thereby causing periodic radial constrictions of the cylinder. These constrictions produce a pumping action on the gas between the stator and the mass, which action suspends or levitates the mass.

Since, in the cylindrical configuration described, the suspension forces are radial in direction, the mass may be left free to translate axially with respect to the stator. Thus a more specific object of the invention is the provision of a single axis accelerometer in which a test mass is substantially frictionlessly supported in the fashion described in the foregoing so as to be free for movement along only one axis. Detector means are added to the combination for producing signals representing displacement of the mass relative to the stator as an indication of acceleration components along the free axis of the mass.

In another form of the invention, an embodiment of which is specifically described in the following, a mass may be suspended so as to be fully supported with respect to a surrounding stator. In accordance with the invention, this may be accomplished by causing a flux pattern to appear both circumferentially and radially in a hollow cylindrical stator of magnetostrictive material. Such a flux pattern produces both radial and axial constriction of the stator. Thus a mass including both an axial portion disposed within the stator and axially opposite end portions disposed externally adjacent the stator may respond both radially and axially to the gas film generated by the constrictions to be fully suspended free from physical contact with the stator.

The invention may be best understood by reference to the following description of specific embodiments, which description is to be taken with the accompanying drawings of which:

FIG. 1 is a cross-sectional view of an accelerometer embodying the invention;

FIG. 2 is an isometric view of the stator portion of the embodiment of the invention shown in FIG. 1;

FIG. 3 is a cross-sectional view of a second embodiment of the invention; and

FIG. 4 is an isometric view of the stator portion of the embodiment shown in FIG. 3.

FIGS. 1 and 2 illustrate a single-axis accelerometer employing a magnetostrictive stator 10 which supports a substantially cylindrical test mass 12 for freedom of displacement along axis 14 in accordance with the invention. Stator 10, which may be cast as a single piece of magnetostrictive ferrite, includes a substantially cylindrical portion 16 having formed therein a central bore 18. The cylindrical portion 16 is symmetrical about axis 14 and is substantially uniform in radial thickness. Bore 18 is of sufficient diameter to accommodate the cylindrical test mass 12 in radially spaced relation therein as shown in FIG. 1.

Stator 10 further includes an externally appendant portion 20 which is radially spaced from the cylindrical portion 16 to define an axially extending opening 22. The appendant portion 20 is arcuate in cross section and substantially semicylindrical. Portion 20 is physically and magnetically integrated with portion 16 at diametrically opposite points on the outer surface of cylindrical portion 16. In addition, the radial thickness of arcuate portion 20 is approximately twice the radial thickness of cylindrical portion 16.

As shown in FIG. 1, the axial bore 18 accommodates test mass 12 therein. The test mass 12 may be constructed of a non-magnetic material such as a ceramic and provided with a smooth cylindrical surface suitable for use in a gas-type journal bearing. The crescent shaped opening 22 accommodates a winding 24 which is electrically connected to an alternating current source 26 which produces current in the winding 24. Such current induces the flow of time varying flux in the arcuate portion 20 which, in turn, is conducted through the cylindrical portion 16 of the stator 10. The circumferential flux flow pattern which is induced in the cylindrical portion 16 causes that portion to constrict radially at a frequency of twice the frequency of source 26.

When operated in an atmosphere of air or other inert gas such as helium, the radial construction of cylindrical portion 16 produces a pumping action on the air within the radial gap between the inner surface of bore 18 and the outer cylindrical surface of test means 12. This pumping or squeezing action produces an axial flowing film of air which supports the test mass 12 free from physical contact with the inner surface of stator 10. Because of the ratio between the radial thicknesses of arcuate portion 20 and cylindrical portion 16 as well as the uniform radial dimension of cylindrical portion 16, the flux flow circumferentially about the bore 18 is substantially uniform in density and thus produces substantially uniform radial constrictions of stator 10. It will be appreciated that such uniform radial constrictions tend to produce a uniform air film which prevents the introduction of forces on the test mass 12 which would tend to rotate test mass 12 about axis 14. Therefore, in the absence of externally applied accelerations, it is possible for the mass 12 to remain entirely motionless within the stator 10.

In the embodiment of FIGS. 1 and 2, all support which is produced by the pumping action of stator 10 acts radially upon mass 12. Therefore, the mass 12 is free in the absence of other restricting mechanisms to translate along the axis 14. This single axis freedom is radially usable in a single axis accelerometer in which components of acceleration tending to displace mass 12 along axis 14 may be measured. Such an accelerometer may be implemented in various ways including the implementation shown in FIG. 1.

The accelerometer implementation includes the addition of ferrite armatures 28 and 30 to the axially opposite ends of test mass 12. The armatures are substantially cylindrical in shape and may be affixed to the test mass 12 in any suitable fashion. Disposed adjacent the armatures 28 and 30, but axially spaced therefrom, are axial pickoffs 32 and 34, which are substantially alike. Pickoff 34, for example, includes a ferrite cup 36 having an axially wound coil 38 disposed therein. The end cup 36 is covered with a ferrite face plate 40 as shown.

Coil 38 may be energized from an excitation source, such as 26, to produce a generally axial flux pattern which produces a repulsive force on the armature 30 of mass 12. Since the pickoff units 32 and 34 produce similar forces, the test mass 12 remains substantially centered between the pickoff 32 and 34. In addition, the pickoff may be electrically connected to a signal demodulator unit 42 which interprets variations in the inductance of coil 38 as an indication of the axial spacing between armature 30 and face plate 40. These signals may be presented to a readout unit 44 which may be calibrated to display a reading of acceleration.

The accelerometer is, of course, illustrated in simplified fashion as will be apparent to those skilled in the art.

Many implementations are possible including a force rebalance system wherein power required to resist displacement of the mass 12 is measured. The description is intended to indicate primarily that in an accelerometer it is necessary to provide basic components including an axially displaceable test mass, and means for detecting axial displacements of the mass as a function of applied acceleration.

Referring to FIGS. 3 and 4, there is illustrated an embodiment of the invention which is capable of providing triaxial support of a mass. The embodiment includes a stator 50 which is cast from magnetostrictive ferrite. The stator comprises two axially spaced cylinder portions 52 and 54 which are bored to a uniform radial thickness and spaced along a longitudinal axis of symmetry. The cylinders 52 and 54 are physically and magnetically joined by axial sections 56 and 58 which, as shown in FIG. 3, are radially bowed so as to be outwardly recessed from the inner surfaces of cylinders 52 and 54. Axial sections 56 and 58 are disposed diametrically opposite one another.

The recessed axial sections accommodate windings 60 and 62 which may be energized in parallel or in series to induce an alternating flux pattern in the portions 56 and 58. This axial flux pattern is thus transferred to the cylinders 52 and 54 where it flows circumferentially as was the case in the FIG. 2 embodiment. This flux pattern both radial and axial constriction of the stator 50 which, because of the dimensional uniformity thereof, is substantially uniform.

As shown in FIG. 3, the cylinders 52 and 54 receive a levitated mass 63 which includes a substantially cylindrical section 64 and two disc-shaped thrust plates 66 and 68 which are disposed on axially opposite ends of the cylinder 64. The members 64, 66 and 68 are provided with smooth bearing surfaces by means of a ceramic coating. Members 64, 66 and 68 may all be integrated by means of a central spindle 70.

As shown in FIG. 3, the diameter of the bore through cylinder 52 and 54 is slightly greater than the diameter of the cylinder 64 thus providing a gap 72 between the stator and supported mass assemblies. When operated in an atmosphere of air or other gas such as helium, the aforementioned radial constrictions of the stator 50 produce a pumping action in the air which radially supports the cylinder 64 free from physical contact with the stator 50. In addition, the axial dimension of cylinder 64 is slightly greater than the axial dimension of stator 50 thus producing annular gaps 74 and 76 which communicate with the cylindrical gap 72. The combination of the radial and axial constriction of stator 50 produces a film of air which flows radially through the gaps 74 and 76 thus providing axial supporting forces upon the thrust plates 66 and 68. These axial forces are substantially uniform and substantially self-adjusting so as to maintain the combination of cylinder 64 and thrust plates 66 and 68 centered with respect to the stator 50 as shown in FIG. 3. Thus the combination 64, 66, 68 and 70 is freely supported completely out of physical contact under normal conditions from the stator 50.

For a fine flux adjustment, the stator 50 may be tapped to receive threaded inserts 78 and 80. These inserts may be constructed of magnetic material and may be adjusted in radial position to balance the distribution of flux within the stator 50.

It is to be understood that various modifications and additions to the embodiments of the invention described herein are possible without departing from the spirit and scope of the invention and thus the foregoing description is not to be construed in a limited sense. For a definition of the invention, reference should be taken to the appended claim.

I claim:

1. A hydrostatic gas bearing comprising a cylinder of magnetostrictive material having an axial bore, a mass disposed within the bore and having a smooth cylindrical outer surface spaced from the surface of the bore by a radial gap, means to produce a time varying flux in the cylinder uniformly about the bore thereby causing periodic radial constriction of the cylinder, said means comprising an appendant portion of magnetic material defining a flux path separate from the cylinder, and a winding surrounding said path and adapted for connection to a source of alternating current, the portion of magnetic material being magnetically integrated to the cylinder to induce the uniform flow therein.

2. Apparatus as defined in claim 1 wherein the portion of magnetic material comprises a substantially semicylindrical section of a length substantially equal to that of the cylinder and of a radius larger than that of the cylinder, the section being radially spaced from the outer surface of the cylinder to accommodate the winding but magnetically integrated with the cylinder at diametrically opposite points on the cylinder to permit transfer of flux thereto.

3. Apparatus as defined in claim 1 further including detector means disposed adjacent each end of the mass for producing signals representing axial displacement of the mass relative to the cylinder as a result of an acceleration acting on the apparatus.

4. An accelerometer comprising an integral stator of magnetostrictive material having a hollow cylindrical portion of uniform radial thickness, a semicylindrical portion joined to the cylindrical portion at diametrically opposite points on the outer surface thereof and bounding a radial space between the two portions, a winding disposed about the semicylindrical portion and adapted for connection to a source of periodically varying current, a mass disposed within the stator and having a smooth cylindrical outer surface which is radially spaced from the inner surface of the stator by air pressure generated by periodic radial constrictions of the stator, and means for producing signals representing axial displacements of the mass relative to the stator as a result of axial acceleration components acting on the accelerometer.

5. Apparatus as defined in claim 4 wherein the stator is cast from magnetostrictive ferrite.

6. A multi-axial hydrostatic gas bearing comprising a stator of magnetostrictive material having two coaxial and hollow cylinders joined by two diametrically opposite legs, winding means disposed on the legs and adapted for connection to a source of periodically varying current thereby to induce a circular flux in the cylinders and axial flux in the legs resulting in both radial and axial constriction of the station, a mass comprising an axial portion having a smooth cylindrical outer surface disposed within the stator and radially spaced therefrom to respond to the radial constrictions of the stator and axially opposite thrust plates disposed externally adjacent the ends of the stator and axially spaced therefrom to respond to the axial constrictions of the stator.

7. Apparatus as defined in claim 6 wherein the stator is cast from magnetostrictive ferrite.

8. Apparatus as defined in claim 6 wherein said stator is integral and said legs are radially outwardly bowed.

References Cited

UNITED STATES PATENTS

| | | | |
|---|---|---|---|
| 2,834,943 | 5/1958 | Grisdale | 310—11 |
| 3,090,239 | 5/1963 | Ducas | 73—17 |
| 3,171,696 | 3/1965 | Houghton | 308—1 |
| 3,212,341 | 10/1965 | Keller | 73—516 |

JAMES J. GILL, Primary Examiner

H. GOLDSTEIN, Assistant Examiner

U.S. Cl. X.R.

308—1